United States Patent
McAuliffe et al.

(10) Patent No.: US 10,352,355 B2
(45) Date of Patent: Jul. 16, 2019

(54) FOIL BEARING WITH SPLIT KEY

(71) Applicants: Christopher McAuliffe, Windsor, CT (US); Anthony Santiago, Simsbury, CT (US)

(72) Inventors: Christopher McAuliffe, Windsor, CT (US); Anthony Santiago, Simsbury, CT (US)

(73) Assignee: HAMILTON SUNDSTRAND CORPORATION, Windsor Locks, CT (US)

( * ) Notice: Subject to any disclaimer, the term of this patent is extended or adjusted under 35 U.S.C. 154(b) by 0 days.

(21) Appl. No.: 15/491,500

(22) Filed: Apr. 19, 2017

(65) Prior Publication Data

US 2018/0306234 A1    Oct. 25, 2018

(51) Int. Cl.
*F16C 17/02* (2006.01)
*F16C 27/02* (2006.01)

(52) U.S. Cl.
CPC ............ *F16C 17/024* (2013.01); *F16C 27/02* (2013.01)

(58) Field of Classification Search
CPC ................................ F16C 17/024; F26C 27/02
See application file for complete search history.

(56) References Cited

U.S. PATENT DOCUMENTS

| | | | |
|---|---|---|---|
| 5,228,785 A | 7/1993 | Saville et al. | |
| 5,911,510 A | 6/1999 | Saville | |
| 6,964,522 B2 | 11/2005 | Kang et al. | |
| 7,070,330 B2 | 7/2006 | Agrawal | |
| 7,614,792 B2 | 11/2009 | Wade et al. | |
| 7,948,105 B2 | 5/2011 | Agrawal et al. | |
| 8,353,631 B2 | 1/2013 | Kim | |
| 8,419,283 B2 | 4/2013 | McAuliffe et al. | |
| 9,028,149 B2 | 5/2015 | Rosen et al. | |
| 2005/0163407 A1 | 7/2005 | Kang et al. | |
| 2006/0018574 A1 | 1/2006 | Kang et al. | |
| 2007/0047858 A1 | 3/2007 | Hurley et al. | |
| 2008/0310779 A1 | 12/2008 | Agrawal et al. | |
| 2014/0205221 A1 | 7/2014 | Saville et al. | |
| 2016/0091015 A1 | 3/2016 | McAuliffe et al. | |

FOREIGN PATENT DOCUMENTS

| | | | |
|---|---|---|---|
| EP | 1566556 A2 | 8/2005 | |
| EP | 1980762 A2 | 10/2008 | |

OTHER PUBLICATIONS

Extended European Search Report; EP Application No. 16181706.9, dated Dec. 2, 2016; 7 pages.

*Primary Examiner* — Alan B Waits
(74) *Attorney, Agent, or Firm* — Cantor Colburn LLP

(57) ABSTRACT

A gear bearing within a cylinder is provided. The gear bearing comprises an anti-rotation tab comprising a first side and a second side, the anti-rotation tab sitting within a key way of the cylinder. Further, the gear bearing also comprises a first foil extending in a first direction from a first end to the first side of the anti-rotation tab and a second foil extending in a second direction from a second end to the second side of the anti-rotation tab.

5 Claims, 4 Drawing Sheets

FOIL BEARING WITH SPLIT KEY

CROSS-REFERENCE TO RELATED APPLICATIONS

This application is a divisional of U.S. patent application Ser. No. 14/812,333, filed Jul. 29, 2015, the disclosure of which is incorporated by reference herein in its entirety

BACKGROUND OF THE INVENTION

The present disclosure relates generally to a foil bearing with a split key, and more specifically, to a thin foil, hydrodynamic gear bearing comprising a split key to reduce or eliminate a non-synchronous or reverse on the thin foil, hydrodynamic gear bearing.

In general, thin foil, hydrostatic journal bearings are used to support a rotating element in air cycle machines. Historically, journal loading was assumed to be static, (due to gravity or acceleration) or synchronous (1 time per shaft rotation); however, recent experience has shown that there are environments that impose a non-synchronous, high-cycle load on the thin foil, hydrostatic journal bearings. This has led to bearing anti-rotation key cracking (and in some cases separating) initiated at a tight radius at a bottom of a formed key of the thin foil, hydrostatic journal bearing. The cracking is in part due to a geometry of the tight radius, which is an inherently high stress riser. Further, a forming operation necessary to fold the foil into a 180° bend exceeds an ultimate elongation of the foil itself, which leads to an orange peel condition and a degradation in the material fatigue strength.

BRIEF DESCRIPTION OF THE INVENTION

Embodiments include a gear bearing within a cylinder. The gear bearing comprises an anti-rotation tab comprising a first side and a second side, the anti-rotation tab sitting within a key way of the cylinder. Further, the gear bearing also comprises a first foil extending in a first direction from a first end to the first side of the anti-rotation tab and a second foil extending in a second direction from a second end to the second side of the anti-rotation tab.

Additional features and advantages are realized through the techniques of the present disclosure. Other embodiments and aspects of the disclosure are described in detail herein. For a better understanding of the disclosure with the advantages and the features, refer to the description and to the drawings.

BRIEF DESCRIPTION OF THE DRAWINGS

The subject matter that is regarded as the invention is particularly pointed out and distinctly claimed in the claims at the conclusion of the specification. The foregoing and other features, and advantages of the invention are apparent from the following detailed description taken in conjunction with the accompanying drawings in which:

DETAILED DESCRIPTION OF THE INVENTION

Embodiments described herein relate to a foil bearing with a split key, and more specifically, to a thin foil, hydrodynamic gear bearing comprising a split key to reduce or eliminate a non-synchronous or reverse on the thin foil, hydrodynamic gear bearing. An example application of the foil bearing is employing the foil bearing in an air cycle machine in an aerospace environment.

Figure 1:
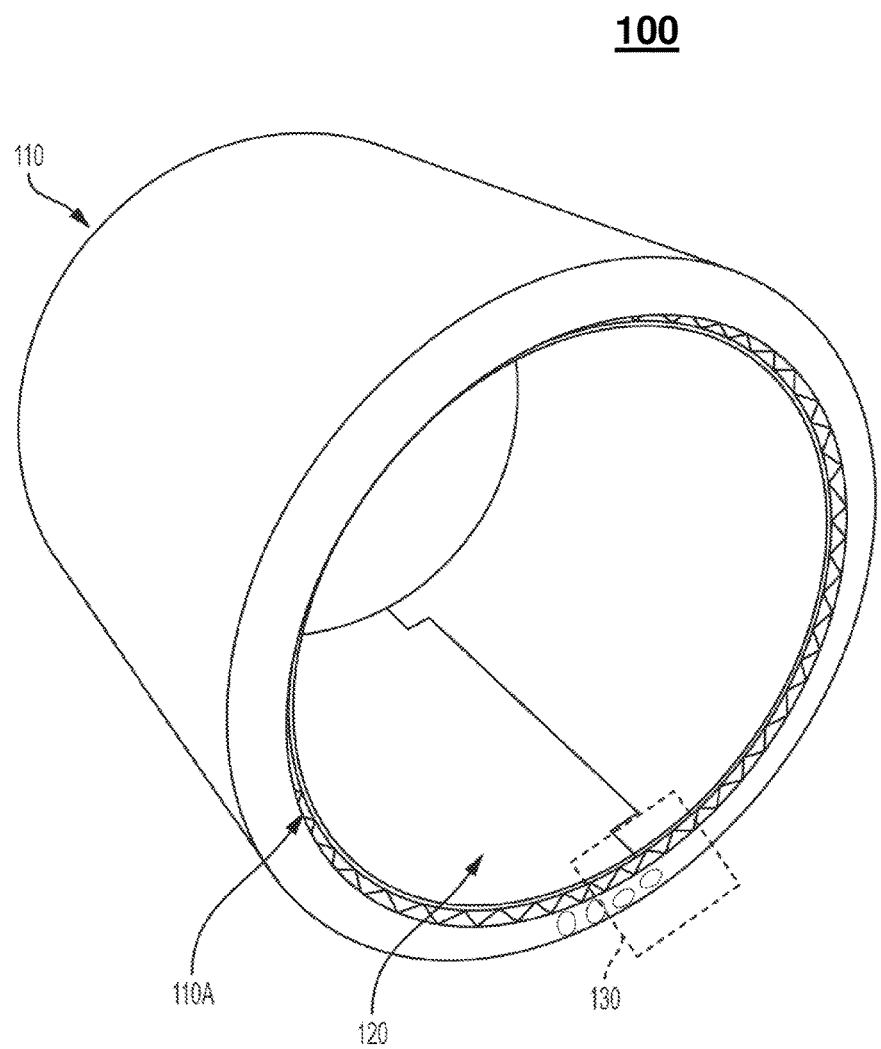
FIG. 1 illustrates a perspective view of a cylinder that houses a gear bearing, which supports a rotating shaft, according to an embodiment of the present invention.

Turning now to FIG. 1, a perspective view 100 of a cylinder 110 that houses within an inner surface 110A a thin foil, hydrodynamic gear 120, which supports a rotating shaft, is shown according to an embodiment of the present invention.

In general, the thin foil, hydrodynamic gear 120 can be a component of an air cycle machine that sits within the cylinder 110 supporting a rotating shaft. The thin foil, hydrodynamic gear bearing comprises a foil and an air film. The foil is a static portion of the thin foil, hydrodynamic gear bearing 120 that does not rotate and sits within a key way. The air film supports the rotating shaft (i.e., the rotating shaft rides on the air film).

Further, the foil is positioned via a key within the cylinder with respect to the key way (e.g., a thin sleeve, slot, or grove down the length of the cylinder). The intersection of the key and the key way prevents the foils from rotating, moving, sliding, etc. Embodiments of this intersection will be shown with respect to FIGS. 2 and 3, which show a magnified view 130 of FIG. 1.

Figure 2:
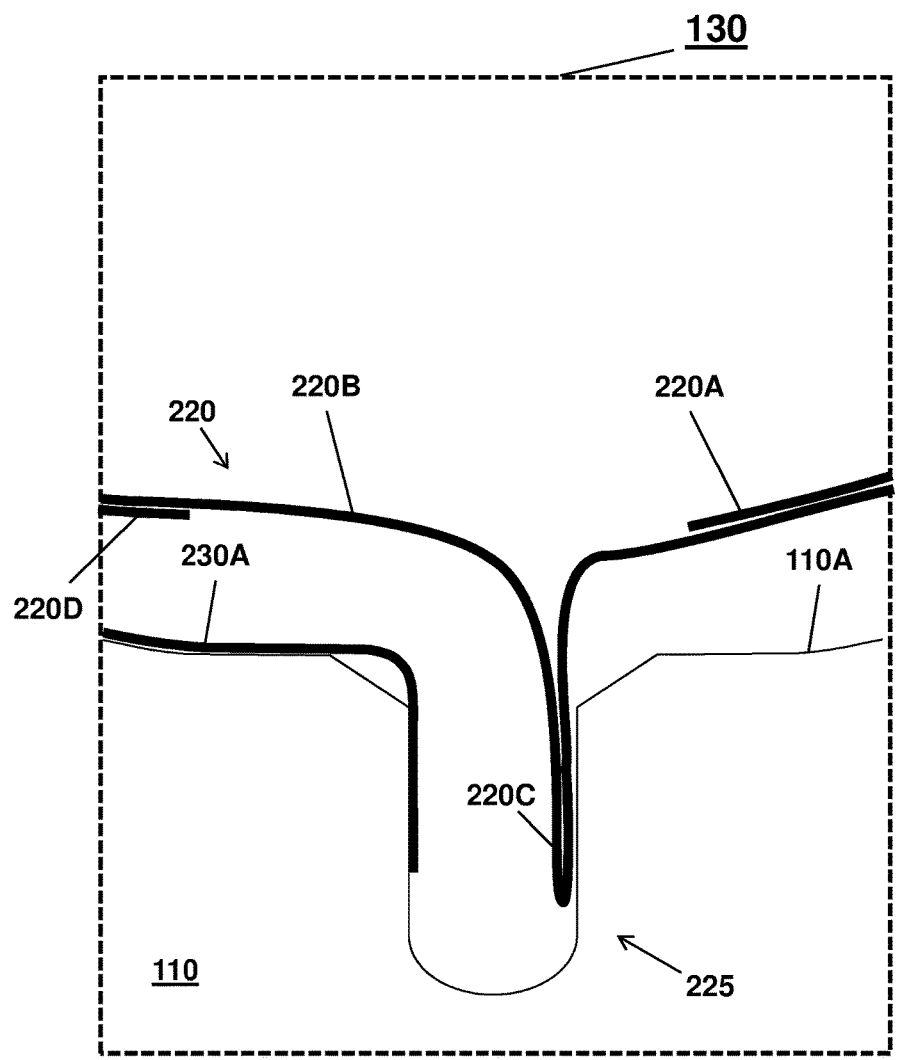
FIG. 2 illustrates an example of the gear bearing intersecting a key way of the cylinder according to an embodiment of the present invention.

FIG. 2 illustrates an example of a portion of a double wrap foil 220 that intersects the cylinder 110 according to an embodiment of the present invention. The double wrap foil 220 is a one-piece foil that encircles the cylinder 110 twice. That is, the double wrap foil 220 extends from a first end 220A in a counter clockwise fashion along the inner surface 110A to an intermediate portion 220B. Continuing after the intermediate portion 220B, a key 220C is formed via a 180° bend. The key 220C is a single anti-rotation tab that sits within the key way 225. The double wrap foil 220, after the key 220C, continues in the counter clockwise fashion to a second end 220D. Note a corrugated foil 230A is included between the inner surface 130 and the intermediate portion 220B. The 180° bend, according to recent experience, has shown that in some environments a non-synchronous, high-cycle load is imposed. This load has led to anti-rotation cracking (and in some cases separating) of the double wrap foil 220 initiated at or near the key 220C.

Figure 3:
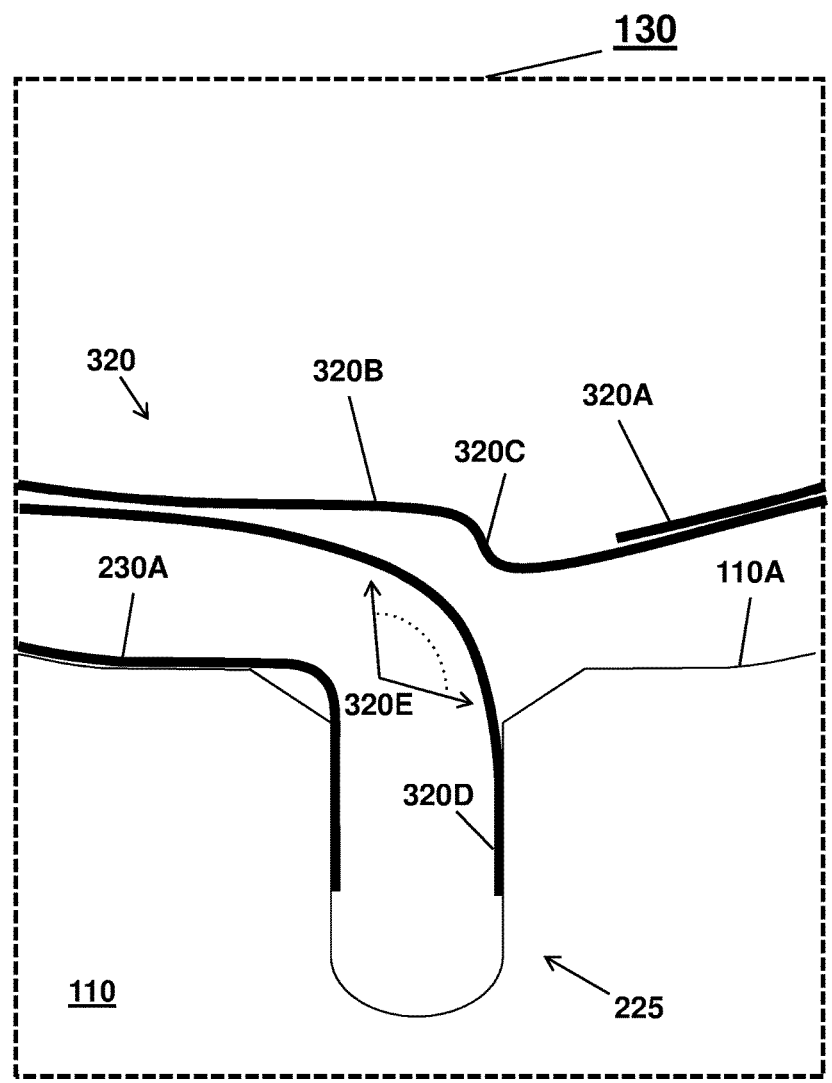
FIG. 3 illustrates another example of the gear bearing intersecting a key way of the cylinder via a trailing edge key according to an embodiment of the present invention.

In view of the load issues with the double wrap foil 220, FIG. 3 illustrates another example of a gear bearing intersecting a cylinder via a trailing edge key embodiment. The trailing edge key embodiment is a one-piece foil 320 that encircles the cylinder 110 twice. As seen in FIG. 3, the foil 320 extends from a first end 320A in a counter clockwise fashion to form a first loop within the inner surface 110A. The first loop concludes at an intermediate portion 320B. The intermediate portion 320B includes a dogleg bend that directs the foil 320 under the first end 320A. Then, the foil 320 continues to form a second loop between the first loop and the inner surface 110A. At the conclusion of the second loop, the foil 320 forms a trailing edge key 320D that abuts a side of the key way 225 opposite of the corrugated foil 230A.

The trailing edge key 320D is an anti-rotation tab that sits within the key way 225. The trailing edge key 320D has a large radius 320E (i.e., in contrast to the 180° bend of the key 220C) that significantly reduces or eliminates stress riser associated with the key 220C. The trailing edge key 320D can be formed without exceeding ultimate elongation of the foil 320. Thus, the trailing edge key 320D eliminates the 180° bend of the double wrap foil 220 (e.g., replaces it with key on the trailing edge of the second loop or intermediate foil).

Figure 4:
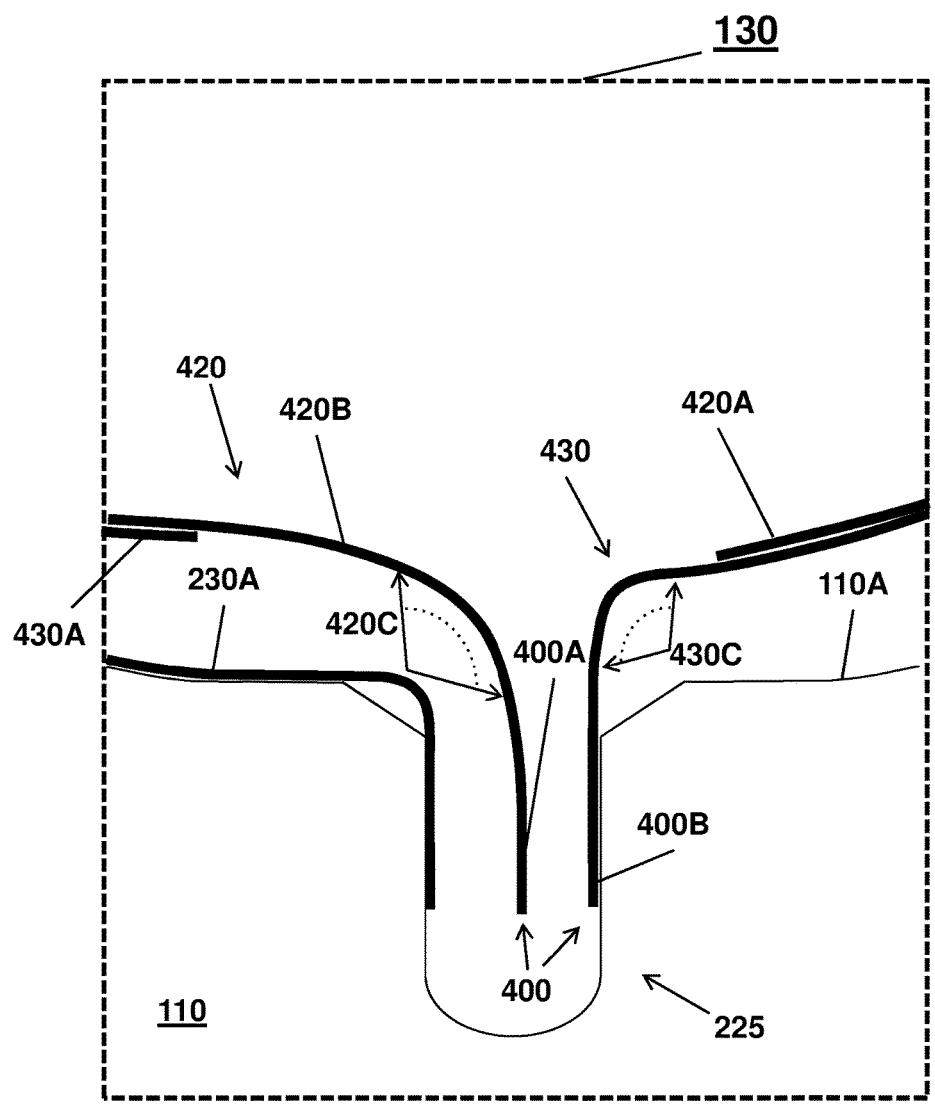
FIG. 4 illustrates another example of the gear bearing intersecting a key way of the cylinder via a split key according to an embodiment of the present invention.

Turning now to FIG. 4, another example of a gear bearing addressing load issues with the double wrap foil 220 is shown. In FIG. 4, a split key 400 embodiment is illustrated via a first foil 420 and a second foil 430 (e.g., respectively a top foil and an intermediate foil). The split key 400 is an anti-rotation tab configuration that sits within the key way 225 as further described below.

The first foil 420 extends from a first end 420A in a counter clockwise fashion to form a first loop within the inner surface 110A. The first loop concludes at an intermediate portion 420B before turning into the key way 225 and forming a first side 400A of the split key 400.

The second foil 430 extends from a second end 430A in a clockwise fashion to form a second loop between the inner surface 110A and the first foil 420. The second loop concludes by turning into the key way 225 and forming a second side 400B of the split key 400.

The second side 400B of the split key 400 abuts an side of the key way 225 opposite of the corrugated foil 230A, while the first side 400A of the split key 400 resides between the second side 400B and the corrugated foil 230A.

The first foil 420 and a second foil 430 eliminate the double wrap foil 220; thereby replacing the key 220C formed via the 180° bend with the first and second sides 400A, 400B of the split key 400. That is, the single anti-rotation tab (and it's 180° bend) is replaced with two separate tabs for the now separate top foil and intermediate foil. Both of the first and second sides 400A, 400B are formed with large radii 420C, 430C, which have a lower stress riser than the tight 180° bend of the double wrap foil 220. Additionally, the larger radius of each tab can be formed with exceeding the foil ultimate strength and suffering the associated degradation in material fatigue strength.

The technical effects and benefits of embodiments of the present invention include creating a foil bearing that is tolerant of non-synchronous or reverse loading and further that comprises a measurably high load capacity. This foil bearing can be utilized in applications with either a high external vibration environment (such as helicopters or engine mounted equipment) or with equipment that experience intermittent reverse rotation (such as permanent magnet electric motors).

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one more other features, integers, steps, operations, element components, and/or groups thereof.

While the invention has been described in detail in connection with only a limited number of embodiments, it should be readily understood that the invention is not limited to such disclosed embodiments. Rather, the invention can be modified to incorporate any number of variations, alterations, substitutions or equivalent arrangements not heretofore described, but which are commensurate with the spirit and scope of the invention.

Additionally, while various embodiments of the invention have been described, it is to be understood that aspects of the invention may include only some of the described embodiments. Accordingly, the invention is not to be seen as limited by the foregoing description, but is only limited by the scope of the appended claims.

What is claimed is:

1. A gas bearing intersecting a cylinder via a trailing edge key, the gas bearing comprising:
   the trailing edge key sitting within a key way of the cylinder, the trailing edge key being between a side of the key way and a corrugated foil within the cylinder, and the trailing edge key abutting the side of key way; and
   a one-piece foil that extends around an interior of the cylinder twice to provide a double wrap, the one-piece foil comprising:
      an intermediate portion comprising a first side and a second side,
      a first loop within an inner surface of the cylinder, the first loop comprising a first foil portion extending in a circumferential direction from a first end of the one-piece foil to the first side of the intermediate portion, and
      a second loop between the first foil portion and the inner surface of the cylinder, the second loop comprising a second foil portion extending in the circumferential direction from the second side of the intermediate portion to a second end of the one-piece foil, the second end of the second foil portion forming the tailing edge key,
   wherein the intermediate portion comprises a dogleg bend that directs the second side of the intermediate portion under the first end.

2. The gas bearing of claim 1, wherein the gas bearing is included in an air cycle machine.

3. The gas bearing of claim 1, wherein the trailing edge key comprises the second foil portion extending along a bend and entering the key way.

4. The gas bearing of claim 3, wherein the bend comprises a radius bend formed to reduce a stress riser associated with the trailing edge key.

5. The gas bearing of claim 3, wherein the bend comprises a radius bend formed without exceeding elongation of the double wrap foil.

* * * * *